(12) United States Patent
Zhong

(10) Patent No.: US 12,669,354 B2
(45) Date of Patent: Jun. 30, 2026

(54) SENSOR FIXING STRUCTURE, WEARABLE DEVICE, AND HOT MELT APPARATUS

(71) Applicant: GOERTEK INC., Shandong (CN)

(72) Inventor: Qiang Zhong, Shandong (CN)

(73) Assignee: GOERTEK INC., Shandong (CN)

( * ) Notice: Subject to any disclaimer, the term of this patent is extended or adjusted under 35 U.S.C. 154(b) by 646 days.

(21) Appl. No.: 18/044,521

(22) PCT Filed: Dec. 15, 2020

(86) PCT No.: PCT/CN2020/136347

§ 371 (c)(1),
(2) Date: Mar. 8, 2023

(87) PCT Pub. No.: WO2022/052353

PCT Pub. Date: Mar. 17, 2022

(65) Prior Publication Data

US 2024/0027238 A1 Jan. 25, 2024

(30) Foreign Application Priority Data

Sep. 14, 2020 (CN) .......................... 202010964434.9

(51) Int. Cl.
*G01D 11/30* (2006.01)
*B29C 65/40* (2006.01)
(52) U.S. Cl.
CPC .............. *G01D 11/30* (2013.01); *B29C 65/40* (2013.01)
(58) Field of Classification Search
CPC ................................. G01D 11/30; B29C 65/40
See application file for complete search history.

(56) References Cited

U.S. PATENT DOCUMENTS 5,416,476 A 5/1995 Rendon

FOREIGN PATENT DOCUMENTS

| CN | 101996785 A | 3/2011 |
| CN | 107332951 A | 11/2017 |
| CN | 107366711 A | 11/2017 |

(Continued)

OTHER PUBLICATIONS

Zhao Yangfeng, et al., Experimental study on the microseism and charge signal time-frequency characteristics in the process of fault stick-slip instability, Chinese Journal of Rock Mechanics and Engineering, vol. 39, No. 7, Liaoning, China, Jul. 2020.

*Primary Examiner* — Jamel E Williams
(74) *Attorney, Agent, or Firm* — Ingrassia Fisher & Lorenz, LLP

(57) ABSTRACT

A sensor fixing structure, a wearable device and a hot melt device are disclosed. The sensor fixing structure comprises a bracket and a sensor structure. A connecting arm is projectingly provided on the bracket. The connecting arm is a hot melt stake. The sensor structure is covered by the bracket. The connecting arm comprises a connecting section and a holding section. One end of the connecting section is connected to the bracket; the other end of the connecting section is connected to the holding section. The holding section is located at a side of the sensor structure that faces away from the bracket, and the sensor structure is held by the holding section to the bracket. The connecting arm forms the holding section by hot melt processing. The packaging effect of the sensor fixing structure is good, and its overall volume is small.

14 Claims, 4 Drawing Sheets

100

(56)                    References Cited

FOREIGN PATENT DOCUMENTS

| CN | 107512004 | A | * | 12/2017 | ............ B29C 65/24 |
|----|-----------|---|---|---------|------------------------|
| CN | 209358745 | U | * | 9/2019  | |
| CN | 111311888 | A |   | 6/2020  | |
| CN | 211280988 | U | * | 8/2020  | |
| CN | 112051619 | A |   | 12/2020 | |

* cited by examiner

100

200

SENSOR FIXING STRUCTURE, WEARABLE DEVICE, AND HOT MELT APPARATUS

CROSS-REFERENCE TO RELATED APPLICATIONS

This Application is a U.S. National-Stage entry under 35 U.S.C. § 371 based on International Application No. PCT/CN2020/136347, filed Dec. 15, 2020 which was published under PCT Article 21(2) and which claims priority to Chinese Application No. 202010964434.9, filed Sep. 14, 2020, which are all hereby incorporated herein in their entirety by reference.

TECHNICAL FIELD

This application pertains to the technical field of electronic device, in particular to a sensor fixing structure, a wearable device using the sensor fixing structure, and a hot melt device for processing the sensor fixing structure.

BACKGROUND

With the diversification and fashionization of wearable devices, conventional wearable devices such as watches, bracelets, headphones and smart glasses can use an infrared sensor to detect whether the wearable device has been worn by a user, so as to control whether the wearable device should be switched from the standby state to the active state to reduce the power consumption of the wearable device, so that the power of the wearable device is more durable and the standby time is longer. However, if the packaging effect of infrared sensor is poor, the sensitivity of the sensor will be lower, water vapor will easily enter the packaged sensor, or the volume of the product obtained will be large. In addition, other objects, desirable features and characteristics will become apparent from the subsequent summary and detailed description, and the appended claims, taken in conjunction with the accompanying drawings and this background.

SUMMARY

A main object of the present disclosure is to provide a sensor fixing structure, which has a good packaging effect and a small overall volume.

To achieve the object, the present disclosure proposes a sensor fixing structure, comprising:

a bracket on which a connecting arm is projectingly provided, wherein the connecting arm is a hot melt stake; and a sensor structure covered by the bracket, wherein the connecting arm comprises a connecting section and a holding section, one end of the connecting section is connected to the bracket, the other end of the connecting section is connected to the holding section, the holding section is located at a side of the sensor structure that faces away from the bracket, and hold the sensor structure to the bracket, and the connecting arm forms the holding section by hot melt processing.

Optionally, there are two connecting arms, the two connecting arms are projectingly provided on a same side of the bracket, the two connecting arms both comprise the connecting section and the holding section, and the sensor structure is located between the connecting sections of the two connecting arms.

Optionally, the two connecting arms are arranged symmetrically with respect to the sensor structure.

Optionally, the sensor structure is an infrared sensor structure, and infrared rays emitted by the infrared sensor structure can pass through the bracket and exit.

Optionally, the sensor structure comprises a circuit board assembly and an infrared sensor mounted on and electrically connected to the circuit board assembly;

the bracket comprises a mounting portion and a penetration portion, the holding section holds a side of the circuit board assembly that is away from the infrared sensor, and the infrared sensor is held to the penetration portion.

The present disclosure also proposes a wearable device, the wearable device comprises a casing, and a sensor fixing structure mounted in the casing;

the sensor fixing structure comprises:

a bracket on which a connecting arm is projectingly provided, wherein the connecting arm is a hot melt stake; and a sensor structure covered by the bracket, wherein the connecting arm comprises a connecting section and a holding section, one end of the connecting section is connected to the bracket, the other end of the connecting section is connected to the holding section, the holding section is located at a side of the sensor structure that faces away from the bracket, the sensor structure is held by the holding section to the bracket, and the connecting arm forms the holding section by hot melt processing.

The present disclosure also proposes a hot melt device for processing the sensor fixing structure. The hot melt device comprises a body portion and a hot melt head extending out of the body portion;

the sensor fixing structure comprises:

a bracket on which a connecting arm is projectingly provided, wherein the connecting arm is a hot melt stake; and a sensor structure covered by the bracket, wherein the connecting arm comprises a connecting section and a holding section, one end of the connecting section is connected to the bracket, the other end of the connecting section is connected to the holding section, the holding section is located at a side of the sensor structure that faces away from the bracket, the sensor structure is held by the holding section to the bracket;

the body portion butts against the sensor structure and is located at a side of the sensor structure that faces away from the bracket, and the hot melt head butts against the connecting arm and melts the connecting arm to form the connecting section and the holding section.

Optionally, the hot melt head is provided with a melt cavity, and the holding section formed by the connecting arm after hot melted by the hot melt head is accommodated and solidified in the melt cavity.

Optionally, the melt cavity extends from an edge of the sensor structure to an inner side of the sensor structure.

Optionally, the body portion is provided with an elastic member, one end of the elastic member is connected to the body portion, and the other end of the elastic member elastically butts against a side of the sensor structure that faces away from the bracket.

In the technical solutions of the present disclosure, the bracket can cover the sensor structure to prevent the sensor structure from being directly exposed, thereby protecting the sensor structure. The connecting arm of the bracket adopts a structural form of hot melt stake, so that the connecting arm is hot meltable. During the forming process of the holding section formed by hot melt processing, the fluid characteristics of the holding section can ensure that the solidified connecting arm tightly holds the sensor structure to the bracket, so that the gap between the sensor structure and the bracket is small, and foreign matters cannot easily enter between the sensor structure and the bracket, and the sensor will not be blocked by foreign matters in the sensing process. Moreover, the sensor structure is close to the bracket, the sensing distance is short, the sensing effect is more accurate, and the detection effect is good. The connection between the sensor structure and the bracket is compact, the packaging effect is good, and thus the overall volume of the sensor fixing structure is smaller.

BRIEF DESCRIPTION OF DRAWINGS

The present invention will hereinafter be described in conjunction with the following drawing figures, wherein like numerals denote like elements, and.

Figure 1:
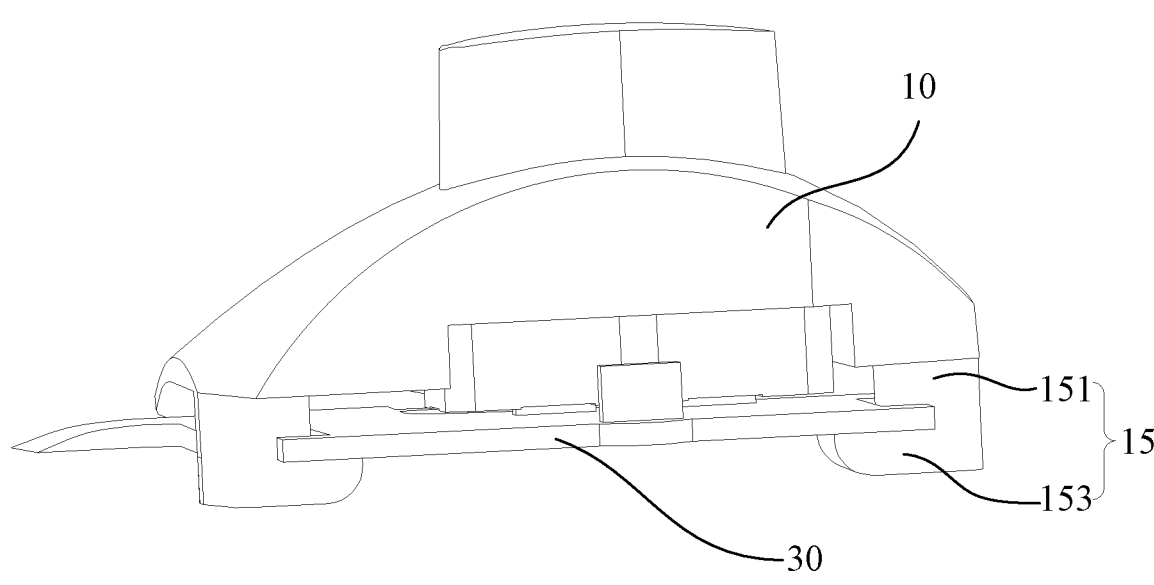
FIG. 1 is a schematic diagram of the structure of an embodiment of a sensor fixing structure of the present disclosure.

In the drawings: 100, sensor fixing structure; 10, bracket; 11, mounting portion; 13, penetration portion; 15, connecting arm; 151, connecting section; 153, holding section; 30, sensor structure. 31, circuit board assembly; 33, sensor; 200, hot melt device; 201, body portion; 203, hot melt head; 2031, melt cavity; 205, elastic member.

The object realization, functional features and advantages of the present disclosure will be further described in combination with the embodiments and with reference to the accompanying drawings.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described clearly and completely below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

It should be noted that all directional indications (such as up, down, left, right, front, back, etc.) in the embodiments of the present disclosure are only used to explain the relative positional relationship, the movement situation, etc. among various components under a certain posture (as shown in the accompanying drawings). If the specific posture changes, the directional indication will also change accordingly.

In addition, in the present disclosure, the terms "first", "second" and the like are used for descriptive purposes only and are not to be construed as indicating or implying relative importance or implicitly indicating the number of indicated technical features. Thus, a feature with "first" or "second" may explicitly or implicitly include at least one such a feature. In addition, the technical solutions in various embodiments of the present disclosure can be combined with each other if their combination is realizable to a person of ordinary skill in the art. When the combination of technical solutions is contradictory or cannot be realized, it should be considered that such a combination of technical solutions does not exist and is not within the scope of protection claimed in the present disclosure.

In wearable devices, especially wireless earphones, in order to ensure that the standby time of wireless earphones is longer, an infrared sensor may be provided in the earphones. When the wireless earphones are worn on the human ear, the infrared rays emitted by the infrared sensor will be reflected back by the surface of the ear canal, and the returned infrared rays will be received by the infrared sensor. According to the measured values of infrared rays emitted and received, it is judged after algorithm calculation whether the earphones are worn on the human ear. If it is judged that the earphones have been worn on the human ear, the earphones are switched from the standby mode to the active mode; if it is judged that the earphones are not worn on the human ear, the earphones are switched from the active state to the standby state to reduce the power consumption of the earphones, so that a single charge of the earphones can use longer.

As shown in FIG. 1, the present disclosure proposes a sensor fixing structure 100, which is used to mount a sensor structure 30 on earphones. The sensor structure 30 is mainly an infrared sensor structure. The infrared sensor structure is mounted on the earphones to detect a distance between earphones and a human ear. It will be appreciated that the technical solution of the present disclosure is not limited to the mounting and fixing of the infrared sensor structure, and the infrared sensor structure may be replaced with other sensors 33 when required. It can be ensured that the fixing structures of other sensors 33 will have the same packaging effect.

In an embodiment of the present disclosure, the sensor fixing structure 100 comprises a bracket 10 and a sensor structure 30, and the bracket 10 covers the sensor structure 30. In order to fix the sensor structure 30 and the bracket 10, a connecting arm 15 is projectingly provided on the bracket 10, that is, one end of the connecting arm 15 is fixedly connected to the bracket 10, and the other end is a free end.

The connecting arm 15 is a hot melt stake made of a hot melt material. The free end of the connecting arm 15 is heated and melted by a hot melt device 200 to make the connecting arm 15 form a connecting section 151 and a holding section 153. One end of the connecting section 151 is connected to the bracket 10, and the other end is connected to the holding section 153. The holding section 153 is located at a side of the sensor structure 30 that faces away from the bracket 10, and hold the sensor structure 30 to the bracket 10.

In the technical solution of the present disclosure, the bracket 10 can cover the sensor structure 30 to prevent the sensor structure 30 from being directly exposed, thereby protecting the sensor structure 30. The connecting arm 15 of the bracket 10 adopts a structural form of hot melt stake, so that the connecting arm 15 is hot meltable. During the forming process of the holding section 153 formed by hot melt, the fluid characteristics of the holding section 153 can ensure that the solidified connecting arm 15 tightly holds the sensor structure 30 to the bracket so that a gap between the sensor structure 30 and the bracket 10 is small, and foreign matters cannot easily enter between the sensor structure 30 and the bracket 10, and the sensor 33 is not blocked by foreign matters in the sensing process. Moreover, the sensor structure 30 is close to the bracket 10, the sensing distance is short, the sensing effect is more accurate, and the detection effect is good. The connection between the sensor structure 30 and the bracket 10 is compact, the packaging effect is good, and thus the overall volume of the sensor fixing structure 100 is smaller.

In the technical solution of the present disclosure, the original form of the sensor fixing structure 100 is that one end of the connecting arm 15 is connected and fixed to the body portion of the bracket 10 by hot melt or other methods, and the other end of the connecting arm 15 extends away from the body portion of the bracket 10 and forms the free end of the connecting arm 15.

In the technical solution of the present disclosure, the sensor fixing structure 100 is processed in its original form by the hot melt device 200. The hot melt device 200 heats and melts the free end of the connecting arm 15, and the melted part of the connecting arm 15 solidifies to form the holding section 153. Under the external force from the hot melt device 200, the holding section 153 is always held the side of the sensor structure 30 that faces away from the bracket 10 during the forming process, so that the solidified holding section 153 can hold the sensor structure 30 to the bracket 10. The sealing effect between the sensor structure and the bracket 10 is good, and the overall structure of the sensor fixing structure 100 formed is compact.

Figure 2:
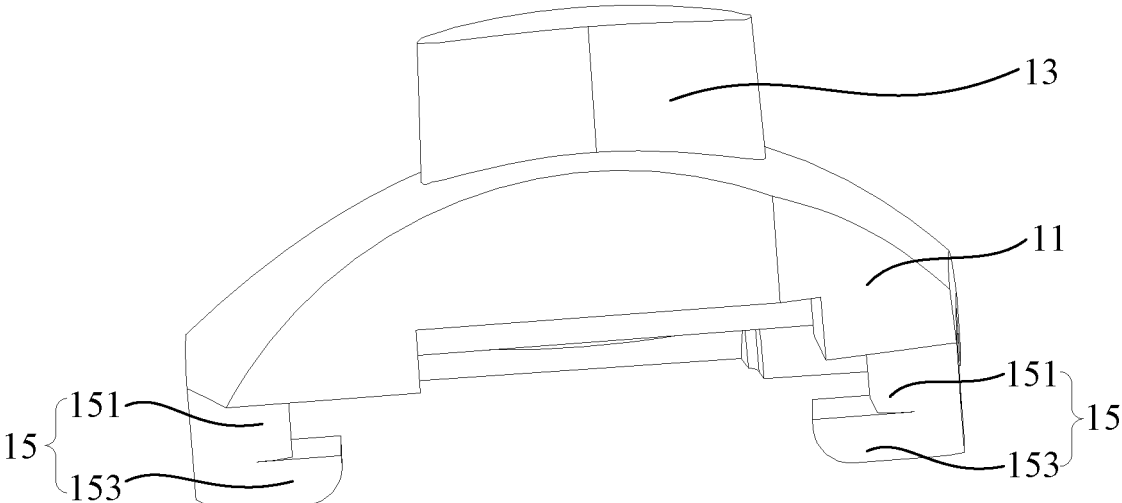
FIG. 2 is a schematic exploded view of the sensor fixing structure in FIG. 1.
Figure 2:
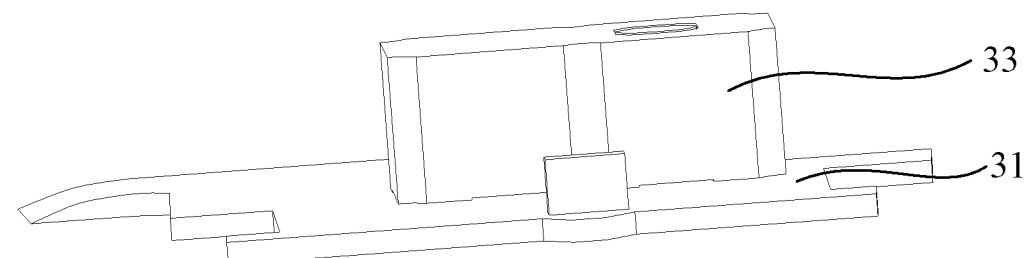

In the embodiment shown in FIG. 2, there are two connecting arms 15. The two connecting arms 15 are projectingly provided on the same side of the bracket 10. Both connecting arms 15 comprise a connecting section 151 and a holding section 153. The sensor structure 30 is located between the connecting sections 151 of the two connecting arms 15.

In this embodiment, before performing hot melt processing on the connecting arms 15, the sensor structure 30 is located between the two connecting arms 15. After performing hot melt processing on the two connecting arms 15 by the hot melt device 200, the two connecting sections 151 are located on the outside of the sensor structure 30, and the two holding sections 153 are bent and extended along ends of the connecting sections 151 that face away from the bracket 10, and are held the side of the sensor structure 30 that faces away from the bracket 10. The configuration of the two connecting arms 15 makes the connection between the bracket 10 and the sensor structure 30 more stable.

It will be appreciated that the technical solution of the present disclosure may comprise only one connecting arm 15. When there is only one connecting arm 15 on the bracket 10, the connecting arm 15 may be extended along the circumferential direction of the sensor structure so that the contact area between the holding section 153 formed by hot melt processing and the sensor structure 30 is large, and it can be ensured that the sensor structure 30 is firmly held to the bracket 10, and the gap between the sensor structure 30 and the bracket 10 is small. Specifically, the connecting arm 15 can be configured to surround a half or more of the circumference of the sensor 33. In the technical solution of the present disclosure, the number of connecting arms 15 may be more, for example, three or four. The multiple connecting arms are evenly arranged at intervals along the circumferential direction of the sensor structure so that the connection effect between the bracket 10 and the sensor structure 30 is better.

In the embodiment shown in FIG. 2, the two connecting arms 15 are disposed symmetrically with respect to the sensor structure 30, that is, after the connecting arms 15 form the connecting segments 151 and the holding segments 153, the two connecting segments 151 are disposed symmetrically on the outside of the sensor 33, and the two holding segments 153 are disposed symmetrically with respect to the sensor structure 30 on the side of the sensor 33 that faces away from the bracket 10. In this technical solution, the forces exerted by the sensor structure 30 on the two connecting arms 15 are more uniform, and the connection between the bracket 10 and the sensor structure 30 is more stable and stronger.

In the sensor fixing structure 100 after processed by the hot melt device 200, two connecting sections 151 are located on the outer side of the sensor structure 30, and two holding sections 153 extend from the outer side to the inner side of the sensor structure 30. Understandably, the bracket 10 and the sensor structure 30 may also be connected by the following connection method.

In the technical solution of the present disclosure, a through hole for mounting the bracket 10 may be provided on the sensor structure 30. Before performing hot melt processing on the sensor fixing structure 100 by the hot melt device 200, the connecting arm 15 of the bracket 10 passes through the through hole on the sensor structure 30 and extends out of the side of the sensor structure 30 that faces away from the bracket 10, and then the free end of the connecting arm 15 is heated and melted by the hot melt device 200, so that after the free end of the connecting arm 15 is melted and solidified, it holds the side of the sensor structure 30 that faces away from the bracket 10. Specifically, the holding section 153 formed by the hot melted free end of the connecting arm 15 extends from the outer side of the sensor structure 30 to the inner side of the sensor structure 30. Alternatively, the holding section 153 formed by the hot melted free end of the connecting arm 15 is extended from the inner side of the sensor structure to the outer side of the sensor structure 30. Alternatively, the holding section 153 may extend in any other direction and keeps the state of holding the sensor fixing structure 100 to the bracket 10.

Understandably, in order to increase the contact area between the holding section 153 and the sensor structure 30, so that the holding effect of the bracket 10 and the sensor structure 30 is better, the holding section 153 may also extend in other directions parallel to the holding surface.

In the embodiment, when the sensor structure 30 is an infrared sensor structure, the infrared sensor structure can emit infrared rays to detect objects in the target direction. The infrared rays emitted by the infrared sensor structure can pass through the bracket 10 and exit. The bracket 10 is only used for packaging the infrared sensor structure, and will not affect the use performance of the infrared sensor structure, thereby ensuring that the infrared emitted by the infrared sensor structure will not be affected.

The sensor structure 30 comprises a circuit board assembly 31 and a sensor 33. The sensor 33 is mounted and electrically connected to the circuit board assembly 31. The circuit board is used for electrical connection of the sensor 33 and also used to support the sensor 33.

In the embodiment, when the sensor structure 30 is provided with the through hole for the connecting arm 15 to pass through, the through hole is provided on the circuit board assembly 31. The part of the connecting arm 15 passing through the through hole is heated and melted by the hot melt device 200. The holding section 153 after melted and solidified holds the side of the circuit board assembly 31 that faces away from the bracket 10.

The circuit board assembly 31 may comprise at least one of the following: a rigid circuit board, a flexible circuit board, and a rigid-flexible board.

When the circuit board comprises a rigid circuit board, the bracket 10 covers the infrared sensor on the circuit board, and the holding section 153 of the connecting arm 15 on the bracket 10 can directly hold the side of the rigid circuit board that is away from the infrared sensor.

When the circuit board comprises a flexible circuit board, the back of the flexible circuit board is provided with a reinforcing plate that supports the infrared sensor connected to the flexible circuit board. The bracket 10 covers the infrared sensor on the flexible circuit board, and the holding section 153 of the connecting arm 15 on the bracket 10 may hold the side of the reinforcing plate that faces away from the infrared sensor.

When the circuit board comprises a rigid-flexible board, if the part of the sensor structure 30 for connecting the bracket 10 is a rigid circuit board, the above connection method of the rigid circuit board will be adopted; if the part of the sensor structure 30 for connecting the bracket 10 is a flexible circuit board, the above connection method of the flexible circuit board will be adopted.

The bracket 10 comprises a mounting portion 11 and a penetration portion 13. The holding section holds the side of the circuit board assembly 31 that faces away from the infrared sensor, and the infrared sensor is held to the penetration portion 13.

In the technical solution of the present disclosure, the sensor structure 30 is mainly an infrared sensor structure, and the infrared rays emitted by the infrared sensor structure can pass through the bracket 10 and exit.

The penetration portion 13 is made of materials that can transmit infrared rays. Specifically, it may be a plastic part that can transmit infrared rays.

The penetration portion 13 is projectingly provided in the direction away from the sensor structure 30 and an accommodating groove is formed in the penetration portion 13, so that after the bracket 10 is connected with the circuit board assembly 31 of the sensor structure the infrared sensor may be accommodated in the accommodating groove formed in the penetration portion 13. During the working process of the sensor fixing structure 100, the infrared rays emitted by the infrared sensor can pass through the penetration portion 13 to the outside of the bracket 10.

The shape of the accommodating groove formed in the penetration portion 13 matches the shape of the infrared sensor, so that the space in the accommodating groove is properly used to accommodate the infrared sensor. The infrared sensor is held to the bottom wall of the accommodating groove, so that the sensor fixing structure 100 formed by connecting the bracket and the sensor structure 30 is compact in overall structure and small in volume.

When the sensor 33 is another type of sensor 33, for example, an ultrasonic sensor 33, the bracket 10 can pass through different emission energy accordingly.

The present disclosure also proposes a wearable device (not shown). The wearable device comprises a casing and a sensor fixing structure 100. Regarding the specific structure of the sensor fixing structure 100, please refer to the embodiments above. Since the sensor fixing structure 100 adopts the technical solutions of all the embodiments above, it at least has all the beneficial effects brought by the technical solutions of the embodiments above, which will not be repeated here. The sensor fixing structure 100 is mounted to the casing.

The casing may be a structure integral with or a structure separated from the bracket of the sensor fixing structure 100. When the casing and the bracket 10 are separated structures, the sensor fixing structure 100 is mounted to the casing through the bracket 10, the penetration portion 13 of the bracket 10 is embedded in the casing, and the casing is provided with a through hole corresponding to the penetration portion 13, so that when the sensor 33 in the sensor fixing structure 100 is an infrared sensor, the infrared rays emitted by the infrared sensor can pass through the penetration portion 13 to the outside of the casing.

The wearable device also comprises other functional structures. For example, when the wearable device is earphones, the wearable device also comprises a loudspeaker unit, which is mounted in the casing and separates the inner space of the casing into a front sound cavity and a rear sound cavity. According to the use requirements, the sensor fixing structure 100 may be specifically mounted in the front sound cavity, so that the infrared rays emitted by the infrared sensor in the sensor fixing structure 100 can pass through the casing and radiates on the ear canal of the human body, and thus the distance between the infrared sensor and the ear canal can be detected to determine whether the earphones are worn on the human body.

When the wearable device is a bracelet or a watch, the wearable device may also comprise a watch movement provided in the casing and a watch strap connected to the casing. The watch strap is used to wear the casing on the human wrist. The infrared sensor in the sensor fixing structure 100 is close to and faces toward the back surface of the casing. The back surface is the surface of the bracelet or watch that attaches to the human skin after being worn on the human body.

Understandably, the wearable device may also be other intelligent products that may be worn on the human body, such as smart glasses, smart helmets, smart masks, etc., which are not limited here.

Figure 3:
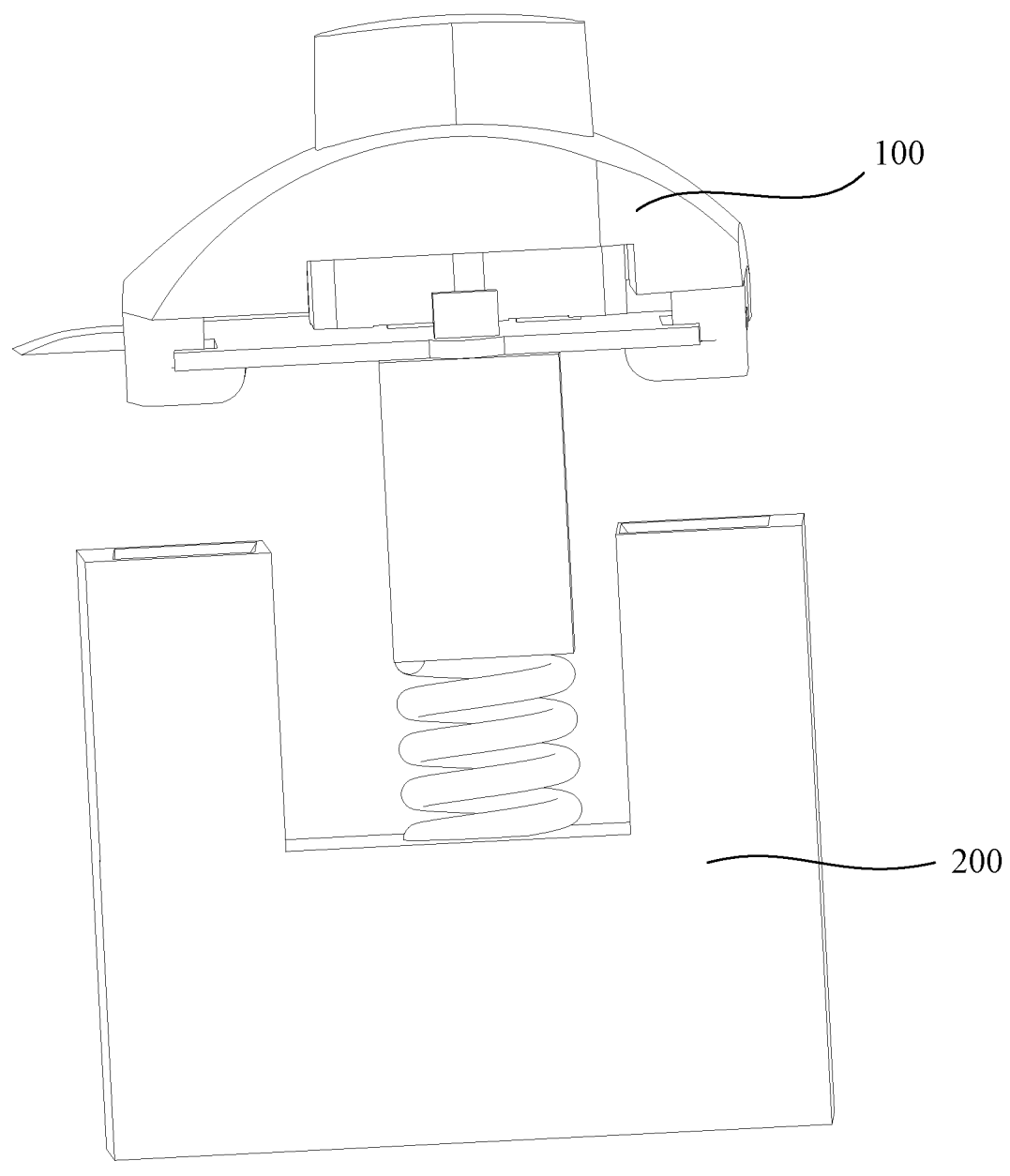
FIG. 3 is a schematic diagram of processing the sensor fixing structure by a hot melt device.
Figure 4:
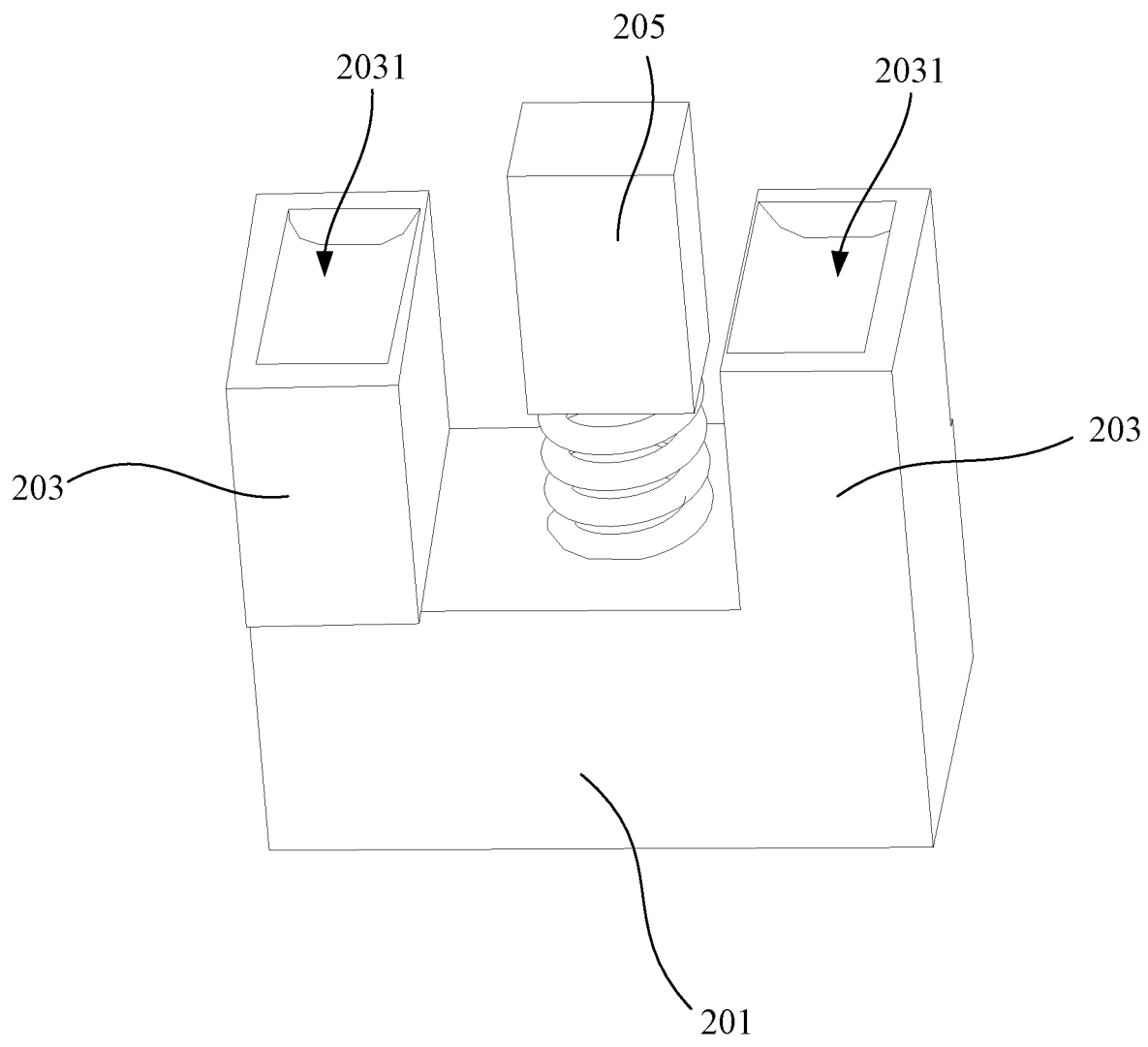
FIG. 4 is a schematic diagram of the structure of the hot melt device in FIG. 3.

Referring to FIGS. 3 and 4, the present disclosure also proposes a hot melt device 200, which is used to process the sensor fixing structure 100. Regarding the specific structure of the sensor fixing structure 100, please refer to the embodiments above.

The hot melt device 200 comprises a body portion 201 and a hot melt head 203 extending out of the body portion 201. The body portion 201 butts against the sensor structure 30 and is located on the side of the sensor structure 30 that faces away from the bracket 10. The hot melt head 203 butts against the connecting arm 15 and can heat and melt the connecting arm 15 to form the connecting section 151 and the holding section 153.

When the hot melt device 200 is processing the sensor fixing structure 100, the body portion 201 of the hot melt device 200 butts against the sensor structure 30, so that the sensor structure 30 and the bracket 10 are in a compressed state by an external force. The hot melt device 200 performs hot melt processing on the connecting arm 15 on the bracket 10 through the hot melt head 203 in this compressed state, so that the holding section 153 formed is still subject to the compression force, and even when the hot melt device 200 is taken away, the holding section 153 can also firmly press the sensor structure 30 to the bracket 10, and thus the bracket 10 has a good packaging effect on the sensor structure 30.

Further, referring to FIG. 4, the hot melt head 203 is provided with a melt cavity 2031, and the melted liquid formed by heating the connecting arm 15 by the melting head 203 is accommodated and solidified in the melt cavity 2031 to form the holding section 153.

In this embodiment, the melt cavity 2031 formed by the hot melt head 203 stores the liquid part of the connecting arm 15 in hot melt processing. In the solution of gluing the sensor structure 30 and the bracket 10 together with glue, the glue will enter the gap between the bracket 10 and the sensor structure 30 due to the fluidity and capillarity of glue, which will affect the sensitivity of the sensor 33. The melt cavity 2031 can limit the flow of the liquid part, so that the liquid part will not flow into the gap between the sensor structure 30 and the bracket and thus will not affect the sensing effect of the sensor structure 30. Compared with the gluing method, the sensor structure 30 and the bracket 10 in the technical solution of the present disclosure have a good sealing effect and a small volume as well as high sensitivity.

The melt cavity 2031 extends from the edge of the sensor structure 30 to the inner side of the sensor structure 30. The shape of the holding section 153 of the connecting arm 15 formed by melting and solidification is consistent with the shape of the melt cavity 2031. The structure of the melt cavity 2031 makes the holding section 153 formed extend from the edge of the sensor structure 30 to the inner side of the sensor structure 30, so that the connecting arm 15 on the sensor fixing structure 100 is easy to form the connecting section 151 and the holding section 153, and thus the processing method of forming the sensor fixing structure 100 by the hot melt device 200 is simple, and the packaging effect of the sensor fixing structure 100 formed is good.

In the solution of sticking the sensor structure 30 and the bracket 10 together with double-sided adhesive tape, the double-sided adhesive tape requires a minimum die cutting width, which increases the volume of the sensor fixing structure 100 on the plane. In addition, the double-sided adhesive tape has a tolerance in thickness, and the sensor structure 30 and the bracket 10 stuck together with double-sided adhesive tape will have an uncertain gap, which increases the risk of foreign matters entering.

In the solution of using a casing to hold the foam to the surface of the sensor structure that faces away from the bracket 10 so that the sensor structure 30 is held to the bracket 10, a larger accommodating space is necessary.

In the technical solution of the present disclosure, during the hot melt process of the connecting arm 15, the hot melt device 200 always holds the side of the sensor structure 30 that faces away from the bracket 10 so that the sensor structure 30 and the bracket 10 remain in a compressed state. Even after the hot melt device 200 is taken away, the solidified holding section 153 can replace the holding effect of the hot melt device 200 on the sensor structure 30. Compared with the sticking method with double-sided adhesive tape and the foam holding method, the connection and sealing between the sensor structure 30 and the bracket 10 according to the technical solution of the present disclosure are good, and small in size.

Further referring to FIG. 4, the body portion 201 of the hot melt device 200 is provided with an elastic member 205, one end of the elastic member 205 is connected to the body portion 201, and the other end may elastically butts against the side of the sensor structure 30 that faces away from the bracket 10.

In this embodiment, the hot melt device 200 holds the sensor structure 30 through the elastic member 205. The elastic member 205 can adjust the holding force of the hot melt device 200 on the sensor structure 30 to prevent the holding force between the sensor structure 30 and the bracket 10 from being too large to damage the sensor structure 30 due to rigid contact.

The elastic member 205 may comprise an elastic member and a butting member. One end of the elastic member is connected to the body portion 201 of the hot melt device 200, and the other end is connected to the butting member. The butting member holds the side of the sensor structure 30 that faces away from the bracket 10. The elastic member may be made of a structure or material with good elasticity, such as a spring, an elastic piece or silicone. During the elastic member 205 holding the sensor structure 30, the hot melt head 203 performs hot melt processing on the free end of the connecting arm 15. The holding section 153 formed can firmly hold the surface of the sensor structure 30 away from the bracket 10, so that the holding force between the sensor structure 30 and the bracket 10 can ensure that foreign matters will not easily enter the gap between the sensor structure 30 and the bracket 10, and the sensor structure 30 can play its sensing role well with good sensitivity.

The above only describes the preferred embodiments of the present disclosure, and does not limit the patent scope of the present disclosure. Any equivalent structural substitution made based on the description and drawings of the present disclosure, or direct/indirect application in other related technical fields without going beyond the inventive concept of the present disclosure, shall all be included in the patent protection scope of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A sensor fixing structure, comprising:

a bracket on which a connecting arm is projectingly provided, wherein the connecting arm is a hot melt stake; and a sensor structure covered by the bracket, wherein the connecting arm comprises a connecting section and a holding section, one end of the connecting section is connected to the bracket, the other end of the connecting section is connected to the holding section, the holding section is located at a side of the sensor structure that faces away from the bracket, and hold the sensor structure to the bracket, and the connecting arm forms the holding section by hot melt processing, the sensor structure is an infrared sensor structure, and infrared rays emitted by the infrared sensor structure can pass through the bracket and exit, wherein the sensor structure comprises a circuit board assembly and an infrared sensor mounted on and electrically connected to the circuit board assembly;

the bracket comprises a mounting portion and a penetration portion, the holding section holds a side of the circuit board assembly that is away from the infrared sensor, and the infrared sensor is held to the penetration portion.

2. The sensor fixing structure according to claim 1, wherein there are two connecting arms, the two connecting arms are projectingly provided on a same side of the bracket, the two connecting arms both comprise the connecting section and the holding section, and the sensor structure is located between the connecting sections of the two connecting arms.

3. The sensor fixing structure according to claim 2, wherein the two connecting arms are arranged symmetrically with respect to the sensor structure.

4. A wearable device, comprising: a casing, and the sensor fixing structure according to claim 1 mounted in the casing.

5. A hot melt device for processing the sensor fixing structure according to claim 1, wherein the hot melt device comprises a body portion and a hot melt head extending out of the body portion, the body portion butts against the sensor structure and is located at a side of the sensor structure that faces away from the bracket, and the hot melt head butts against the connecting arm and melts the connecting arm to form the connecting section and the holding section.

6. The hot melt device according to claim 5, wherein the hot melt head is provided with a melt cavity, and the holding section formed by the connecting arm after melted by the hot melt head is accommodated and solidified in the melt cavity.

7. The hot melt device according to claim 6, wherein the melt cavity extends from an edge of the sensor structure to an inner side of the sensor structure.

8. The hot melt device according to claim 5, wherein the body portion is provided with an elastic member, one end of the elastic member is connected to the body portion, and the other end of the elastic member elastically butts against a side of the sensor structure that faces away from the bracket.

9. The sensor fixing structure according to claim 2, wherein the sensor structure is an infrared sensor structure, and infrared rays emitted by the infrared sensor structure can pass through the bracket and exit.

10. The sensor fixing structure according to claim 3, wherein the sensor structure is an infrared sensor structure, and infrared rays emitted by the infrared sensor structure can pass through the bracket and exit.

11. A wearable device, comprising: a casing, and the sensor fixing structure according to claim 2 mounted in the casing.

12. A wearable device, comprising: a casing, and the sensor fixing structure according to claim 3 mounted in the casing.

13. A hot melt device for processing the sensor fixing structure according to claim 2, wherein the hot melt device comprises a body portion and a hot melt head extending out of the body portion, the body portion butts against the sensor structure and is located at a side of the sensor structure that faces away from the bracket, and the hot melt head butts against the connecting arm and melts the connecting arm to form the connecting section and the holding section.

14. A hot melt device for processing the sensor fixing structure according to claim 3, wherein the hot melt device comprises a body portion and a hot melt head extending out of the body portion, the body portion butts against the sensor structure and is located at a side of the sensor structure that faces away from the bracket, and the hot melt head butts against the connecting arm and melts the connecting arm to form the connecting section and the holding section.

* * * * *